March 27, 1934. L. A. BENNER ET AL 1,952,619
FRUIT CLEANER
Filed Oct. 20, 1931 2 Sheets-Sheet 1
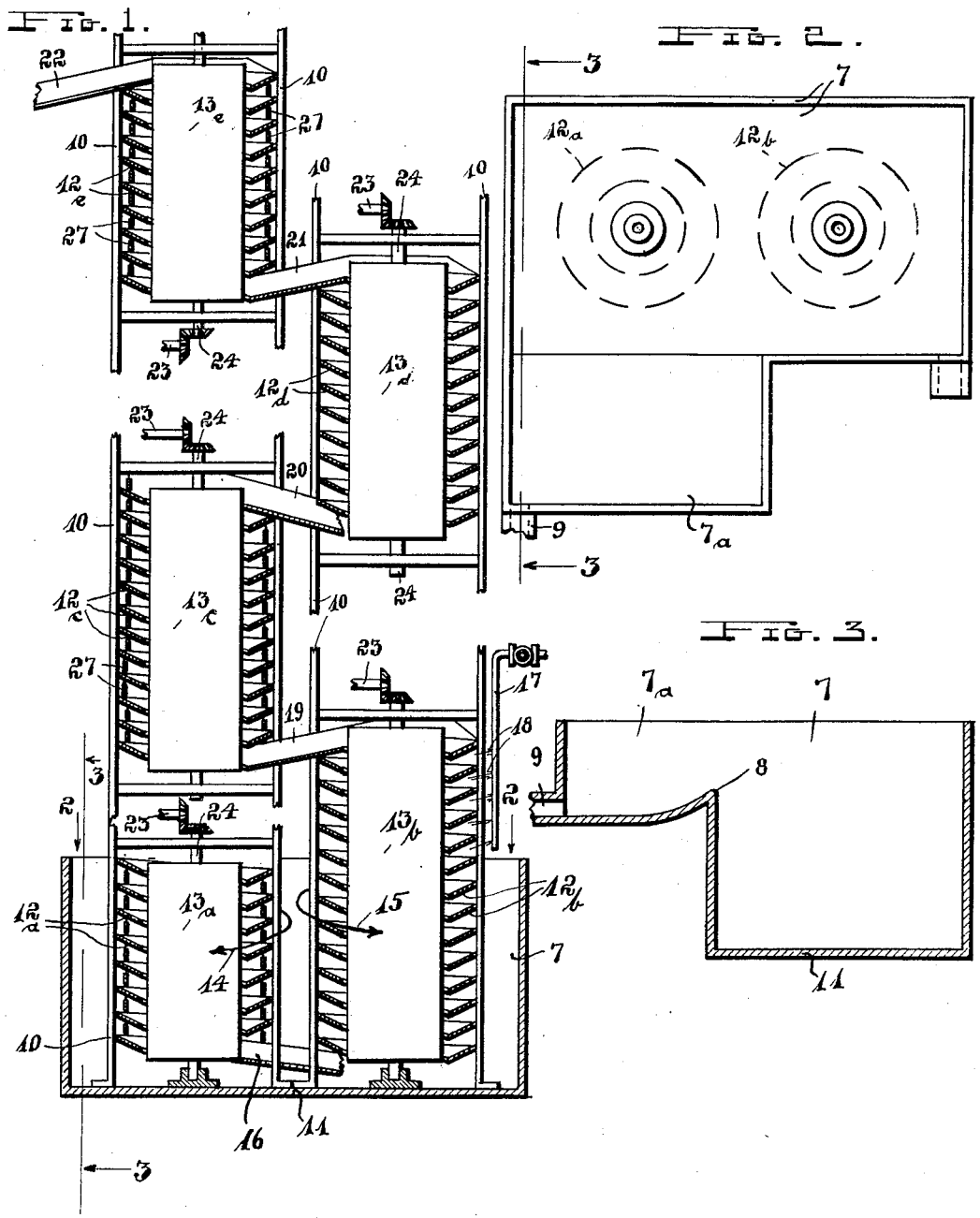
INVENTORS:
LOUIS A. BENNER,
HUBERT F. MOSELEY,
By: Otto H. Ringer,
their Atty.

March 27, 1934.  L. A. BENNER ET AL  1,952,619
FRUIT CLEANER
Filed Oct. 20, 1931  2 Sheets-Sheet 2
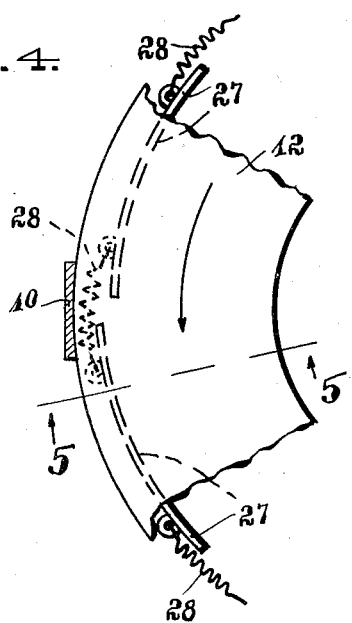
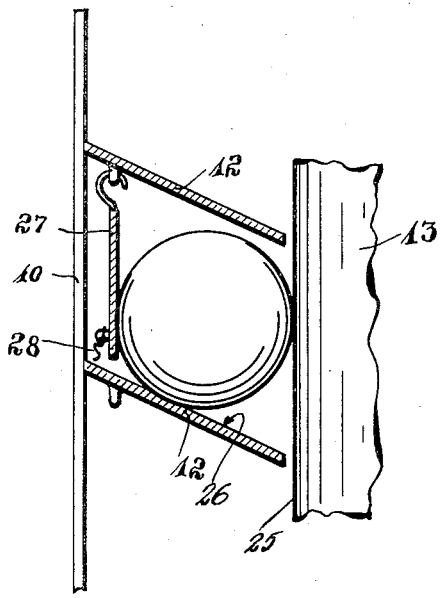
INVENTORS:
LOUIS A. BENNER,
HUBERT F. MOSELEY,
By:— Otto H. Ruger,
their Atty.

Patented Mar. 27, 1934

1,952,619

UNITED STATES PATENT OFFICE 1,952,619

FRUIT CLEANER

Louis A. Benner, Anaheim, and Hubert F. Moseley, Baldwin Park, Calif.

Application October 20, 1931, Serial No. 569,870

1 Claim. (Cl. 146—202)

This invention relates to devices used in washing, drying, and polishing fruit and more particularly comparatively round fruit such as oranges.

One of the objects of this invention is to reduce the enormous space necessary for the customarily used well known types of apparatus now most commonly in use by providing a simplified apparatus.

Another object is to provide actuating members rotating around a vertical axis and designed to move fruit along a helical path by the peripheral contact of the members with the fruit.

Another object is to arrange the rotating members so that fruit will automatically be drawn into the apparatus by the whirl produced by the first section of the apparatus.

Another object is to arrange different members to transfer fruit to the distinct sections of the apparatus for different operations, such as washing, drying, and other processes.

Other objects will appear from the following description and appended claim as well as from the accompanying drawings, in which—

Fig. 1 is a fragmentary, somewhat diagrammatic, vertical midsectional view of a cleaning apparatus showing a general arrangement of parts according to this invention.

Fig. 2 is a top plan view of the main reservoir, having the locations of the two columns about which the diverse cleaning operations are performed indicated in dotted lines.

Fig. 3 is a cross section on line 3—3 of Figs. 1 and 2.

Fig. 4 is a top plan view of a portion of a helical guiding vane, having the locations and positions of swingable baffle plates indicated therein.

Fig. 5 is a vertical cross section of a baffle plate as seen in the direction of the arrows 5—5 in Fig. 4.

Having above referred to oranges in particular, it must be understood that the apparatus disclosed here is not meant to be useful for that fruit only, but, inasmuch as the orange trees require different treatments while the fruit is hanging on the trees and whereby the outer surface of the fruit is to some extent made more sticky than it naturally already is, on the one hand, and whereby soot, resulting from the smudging required in cold days, and other dirt and dust adheres more readily to such a sticky surface, it must be realized that this fruit requires special thorough cleaning before it can be packed or put on the market, and that a drying and polishing after any washing must necessarily take up space since the fruit cannot be handled too roughly if it shall not be bruised or otherwise damaged.

Long and straight horizontal or inclined tables, now commonly in use for drying purposes, or for absorbing or evaporating, however, require too much space and large and long buildings.

With the apparatus disclosed herewith, a considerable length of travel or movement can be provided for individual fruit without taking up much ground or elevation space.

As illustrated in the drawings, several distinct rotating members are provided around and by which oranges can be made to move in a helical path, and by just assuming a diameter of eighteen inches for a member, considering that oranges are approximately three inches, one circular movement of an orange around such a member would be well over five feet in length.

Of course, no particular measurement is meant to be given here, and smaller or larger diameters may be used, but the principle of length of travel is meant to be pointed out.

However, the peculiar arrangement disclosed here is not alone adapted to save space but, moreover, also to furnish facilities for removing any sticky or undesirable substances from the surface of an orange particularly referred to above, as will be explained more in detail hereafter.

The reservoir 7 serves to hold a washing mixture and is furthermore provided with an extension end 7a, to serve as a receptacle into which oranges are first dumped, a splashing baffle 8 being provided to prevent the larger portion of the dirt from entering the main reservoir 7 and at the same time serving to hold oranges back until gradually allowed to pass into the larger reservoir.

A drain connection 9 is provided by which the dirt can be washed from the extension 7a before it splashes over into the main reservoir.

Mounting uprights 10 to extend from the bottom 11 of the reservoir 7 to any desired or required point above the top edge of the reservoir, the helical strips 12 are supported thereby. Of course, inasmuch as the whole structure depends on what sort of objects are to be handled by the apparatus, the requirements for the size must also depend on the size of the objects handled and the mounting and support must vary accordingly.

It must be understood that in case where the apparatus extends through several floors of a build'ng, the various helical strips can be supported by the different floors of the building. The vertical strips or uprights 10 are therefore broken off between the different sections of the apparatus, particularly, since the sections serve distinct operations or processes, to some extent, as pointed out above.

Centrally, spaced from the inner edges of the helical strips 12, with their axes disposed vertically, rotors or turnable members 13 are arranged to come into contact with any objects handled on the helical strips through the whole apparatus.

The peripheral surfaces of the several members 13 are provided with a suitable friction means, hereafter at times referred to as brush, not necessarily consisting of bristles, in fact, not necessarily of any specific material or substance, particularly, since the very purpose or process for which the individual brushes or rotors in the clearly distinct sections of the whole apparatus may require certain surfacing material when used in conjunction with certain fruit for certain treatments.

For the first brush $13_a$ bristles may under certain conditions eventually be the most suitable or useful since the first washing may require a rather severe scrubbing, and then again, depending entirely on the uncertain requirements or even wishes of different operators or manufacturers, as well as on various conditions, as, for instance, the fluid, or mixture, or other medium used for washing or cleaning purposes, other friction means, such as fiber or fibrous material may be just as efficient for other purposes or under certain conditions.

Though the spacing of the helical strip is practically controlled by the size of the objects handled in the apparatus, the incline can nevertheless easily be arranged in various degrees or grades by merely selecting a suitable diameter for the brush and thereby for the helical strip, to assure a ready following of objects over such incline in an upward direction as easily as in a downward direction by the frictional contact with the rotating brush.

Arrow 14 indicates that the brush $13_a$ rotates in one direction while the arrow 15 indicates that the brush $13_b$ rotates in the opposite direction, the distinct sections of helical strips throughout the whole structure being shown inclined in the same direction, in order to procure a downward movement of objects effected by the rotation of the brush $13_a$ with respect to the inclined path-section $12_a$, on the one hand, and an upward movement of objects by means of the rotating brush $13_b$ with respect to the inclined path-section $12_b$, on the other hand.

It should be understood regardless of this showing that all the several brushes $13_a$, $13_b$, $13_c$, $13_d$, and $13_e$ can as well be arranged to turn in the same direction throughout the whole apparatus by arranging the helical path-vanes or strips in suitable or opposite inclines where objects are to be moved down or upwards.

The opposite, down and upward movements for objects are chosen in this case merely to effect an efficient handling of the objects and an efficient operation of the whole apparatus, since the downward drawing of oranges produces a suitable whirl by which oranges are drawn from the dumped position on the extension $7_a$ into the larger reservoir and further into the first or washing section of the apparatus.

As the oranges reach the lowermost position in the first section, being the lowermost terminal of the helical path $12_a$, they are guided through the trough 16 into the lowermost intake end of the helical pathway $12_b$, to be moved upwardly in this pathway until they reach a point above the top edge of the reservoir 7, which concludes the first or washing operation or process.

A rinsing section is provided as a continuation of the last portion of the washing section, in having the brush $13_b$ made longer or extended above the top edge of the reservoir 7 together with the helical strip $12_b$, having furthermore a rinsing-connection 17 arranged so that a rinsing fluid can be sprayed on the oranges, as indicated at 18, as they pass upwardly along the inclined path, whereby any particles of unclean substances or even of the wash mixture are removed in such a manner as to drip back into the wash-reservoir before being taken over to the next section.

A second trough 19 connects the upper end of the pathway $12_b$ with the lower end of the next pathway $12_c$. This next section comprised of the principal parts of the pathway $12_c$ and the brush $13_c$ is intended for the absorbing and partly drying operation and process.

In the next following section, comprised of the principal parts of the pathway $12_d$ and the brush $13_d$, the drying operation and process is intended to be completed, being connected to the previous section by the third trough 20, and being also connected to the next following section by the fourth trough 21.

This last section is intended for the polishing process and operation, the principal parts of the brush $13_e$ and the pathway $12_e$ delivering the oranges to the discharge trough 22, from which the oranges may be moved on to further desired operations or processes in a similar manner or to a packing place.

Short ends of shafts have been indicated for each brush by which the brushes can be operated individually by separate motors not shown in the drawings, by being geared to the shaft-ends of the individual brushes, but it must be understood that all brushes can be operated by one motor jointly.

However, whether the short ends 23 are coupled to individual motors, or the shaft-ends 24 of the several brushes are united into common shafts in the brushes that can so be aligned, or whether the short shaft-ends of the different brushes are geared to a common shaft to be operated by a single motor is immaterial to the principal features of this invention.

It is also not absolutely necessary that the several sections be in alignment one above the other as may be the impression from the illustration in the drawings, since the several troughs can easily be arranged to deliver oranges from one section to the next regardless of where the different sections are located within certain limits, which, however, involves mere mechanical details.

With this arrangement, including principally the rotating brush, and the doubly inclined pathway, the pathway having the natural incline by which the objects are moved upwardly and embodying also the incline of the surface of the pathway with respect to the practically vertical surface of the brush, which is best illustrated in detail in Fig. 5, considering the vertical line 25 and the thereto inclined line 26, objects are rolled in a peculiar manner whereby a scrubbing and rubbing of practically every fraction of the surface of an object may be accomplished to such an extent as to assure a complete removal of every particle of sticky or undesired substances from the surface of the object, since the rotating brush not only causes the object to roll upwardly, subject to friction in one direction, but also causes the object to turn around its own center in a plane practically at right angles to the rolling and certainly never around the same axis as far as the last-named turning is concerned.

To add to this advantageous scrubbing and rubbing, yieldingly suspended shields or baffles 27 are arranged to contact with the object from the opposite side with respect to the brush, the springs 28 being interposed between adjoining shields pressing the object towards the brush.

Having thus described our invention, we claim:—

In a fruit cleaning apparatus, helical pathways centrally inclined downwardly and arranged successively, in distinct sections off-set to one another with respect to their central upright axes, troughs in communication with and connecting one pathway with the next succeeding pathway and arranged to feed fruit by gravity, a brush turnably mounted centrally with respect to each one of said pathways and rotated in a direction to draw objects by frictional contact along these pathways discharging into the next pathways by gravity by way of the communicating troughs for distinctly different operations in the different pathways and brush structures, and a rinsing connection having means to discharge into one of said pathways and adapted to rinse objects passing through this pathway.

LOUIS A. BENNER.
HUBERT F. MOSELEY.